United States Patent
Ali et al.

(10) Patent No.: US 7,921,326 B2
(45) Date of Patent: Apr. 5, 2011

(54) SPATIAL MONITORING-CORRELATION MECHANISM AND METHOD FOR LOCATING AN ORIGIN OF A PROBLEM WITH AN IPTV NETWORK

(75) Inventors: Maher Ali, Plano, TX (US); Chao Kan, Plano, TX (US); Ljubisa Tancevski, Dallas, TX (US); Tim Barrett, North Ryde (AU); Laurent Philippart, Lisbon (PT); Filipe Mendonca, Lisbon (PT); Felicio Vaz, Linda-a-Velha (PT)

(73) Assignee: Alcatel Lucent, Paris (FR)

( * ) Notice: Subject to any disclaimer, the term of this patent is extended or adjusted under 35 U.S.C. 154(b) by 422 days.

(21) Appl. No.: 12/124,095

(22) Filed: May 20, 2008

(65) Prior Publication Data
US 2009/0158096 A1 Jun. 18, 2009

Related U.S. Application Data

(60) Provisional application No. 61/103,120, filed on Dec. 12, 2007.

(51) Int. Cl.
*G06F 11/00* (2006.01)

(52) U.S. Cl. .............................................. 714/4; 714/48

(58) Field of Classification Search .................... 714/43, 714/4, 47, 48, 2, 18, 748, 749, 750, 751
See application file for complete search history.

(56) References Cited

U.S. PATENT DOCUMENTS

| 6,693,907 | B1 | 2/2004 | Wesley et al. | |
|---|---|---|---|---|
| 6,782,490 | B2 | 8/2004 | Maxemchuk et al. | |
| 2007/0058043 | A1* | 3/2007 | Thukral | 348/180 |
| 2008/0049753 | A1* | 2/2008 | Heinze et al. | 370/392 |
| 2009/0285106 | A1* | 11/2009 | Bernard et al. | 370/242 |

OTHER PUBLICATIONS

ATIS-0800002, IPTV Architecture Requirements, Issue Mar. 31, 2006, pp. 1-126.

* cited by examiner

*Primary Examiner* — Dieu-Minh Le
(74) *Attorney, Agent, or Firm* — Capital Patent & Trademark Law Firm, PLLC (57) ABSTRACT

A spatial monitoring-correlation mechanism and a method are described herein for determining an origin of a problem within an Internet Protocol Television (IPTV) network by using topology information about the IPTV network and at least one error notification (e.g., packet loss notification-retransmission request) that is generated by at least one component (e.g., set-top box) within the IPTV network.

25 Claims, 4 Drawing Sheets

SPATIAL MONITORING-CORRELATION MECHANISM AND METHOD FOR LOCATING AN ORIGIN OF A PROBLEM WITH AN IPTV NETWORK

CLAIM BENEFIT OF PRIOR FILED U.S. APPLICATION

This application claims the benefit of U.S. Provisional Patent Application Ser. No. 61/013,120 which was filed on Dec. 12, 2007 the contents of which are hereby incorporated by reference herein.

TECHNICAL FIELD

The present invention is related to a spatial monitoring-correlation mechanism and a method for determining an origin of a problem within an Internet Protocol Television (IPTV) network by using topology information about the IPTV network and at least one error notification (e.g., packet loss notification-retransmission request) that is generated by at least one component (e.g., set-top box) within the IPTV network.

DESCRIPTION OF RELATED ART

The following abbreviations are herewith defined, at least some of which are referred to in the ensuing description of the prior art and the description of the present invention.

ATIS Alliance for Telecommunications Industry Solutions
BTV Broadcast Television
CO Central Office
DSL Digital Subscriber Line
DSLAM Digital Subscriber Line Access Multiplexer
IO Intermediate Office
IP Internet Protocol
IPTV Internet Protocol Television
OLT Optical Line Termination
ONT Optical Network Termination
OSS Operations Support System
RGW Residential Gateway
SAI Service Area Interface
SHO Super Headend Office
STB Set-Top Box
TV Television
VHO Video Hub Office
VLAN Virtual Local Area Network
VoD Video-On-Demand
VoIP Voice over Internet Protocol IPTV networks are used today to deliver digital television service over a broadband connection to subscribers. Typically, if a subscriber does not receive a particular television channel or the received television has unacceptable video quality (e.g., freeze or pixilation) then they would call a customer service representative. Once, the customer service representative receives complaints from several different subscribers regarding this particular television channel then that representative would use multiple diagnostic tool (and possibly send a service person/truck) to follow the video stream associated with the particular television channel from the subscriber set-top boxes upstream to the multicast source to determine the origin of the problem in the IPTV network. This brute-force problem detection scheme is very costly and not very efficient since it does not take into account or correlate information about the different subscribers that are having this particular problem. Accordingly, there is a need for a new mechanism and method which can be used to proactively and efficiently determine an origin of a problem within an IPTV network. This need and other needs have been satisfied by a spatial monitoring-correlation mechanism and method of the present invention.

SUMMARY

In one aspect, the present invention provides a method for locating an origin of a problem within an IPTV network by: (a) obtaining topology information about the IPTV network; (b) obtaining at least one error notification that is generated by at least one component within the IPTV network; and (c) determining the origin of the problem within the IPTV network by using the topology information about the IPTV network and the at least one error notification that is generated by at least one component within the IPTV network.

In another aspect, the present invention provides a spatial monitoring-correlation mechanism including: (a) at least one data collector located in an IPTV network, where the at least one data collector obtains at least one error notification that is generated by at least one component within the IPTV network; and (b) a central correlation engine including a memory that stores processor-executable instructions and a processor that interfaces with the memory and executes the processor-executable instructions to: (i) obtain the at least one error notification from the at least one data collector; (ii) obtain topology information about the IPTV network; and (iii) determine the origin of the problem within the IPTV network by using the topology information about the IPTV network and the at least one error notification that was generated by the at least one component within the IPTV network.

In yet another aspect of the present invention an IPTV network is provided that includes: (a) a plurality of set-top boxes, where each set-top box transmits a packet loss notification-retransmission request when there is a problem with receiving a desired video stream; and (b) a spatial monitoring-correlation mechanism including: (i) at least one data collector that obtains each packet loss notification-retransmission request that was transmitted by the set-top boxes; and (ii) a central correlation engine that obtains each packet loss notification-retransmission request from the at least one data collector, obtains topology information about the IPTV network, and determines the origin of the problem within the IPTV network by using the topology information about the IPTV network and each packet loss notification-retransmission request that was transmitted by the set-top boxes.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
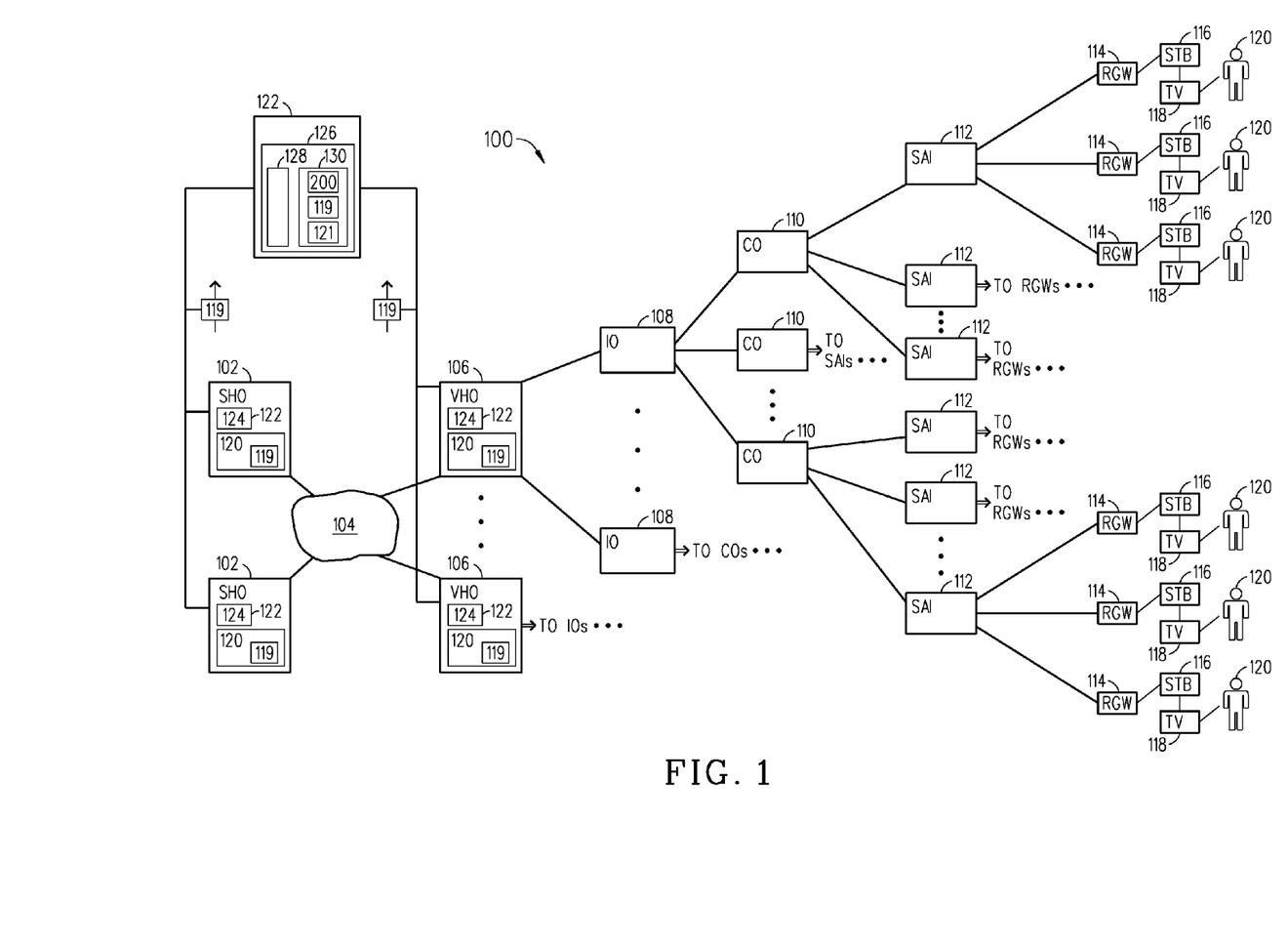
FIG. 1 is a diagram of an exemplary IPTV network which incorporates a spatial monitoring-correlation mechanism in accordance with the present invention.

Referring to FIG. 1, there is a block diagram that illustrates the basic components of an exemplary IPTV network 100 which incorporates a spatial monitoring-correlation mechanism 122 in accordance with the present invention. The exemplary IPTV network 100 has an ATIS architecture and includes two SHOs 102 (routers, acquisition servers, packet retransmission server 120), a core IP network 104, multiple VHOs 106 (acquisition servers, bridges/routers, VoD servers, packet retransmission server 120), multiple aggregation network IOs 108 (routers), multiple access network COs 110 (bridges/routers), multiple SAIs 112 (DSLAMs, ONTs/OLTs) and multiple RGWs 114. The RGWs 114 are connected to STBs 116 which are connected to television sets 118 (or other monitors 118) that are located in the homes of subscribers-viewers 120. A more detailed description about an IPTV network with the ATIS architecture can be found in a standard entitled "ATIS-080002 IPTV Architecture Requirements" which issued Mar. 31, 2006 (the contents of which are incorporated herein by reference).

In operation, each SHO 102 receives international/national TV feeds and supplies those international/national TV feeds via the IP core network 104 to each VHO 106. Then, each VHO 106 receives regional/local TV feeds and multicasts all of the TV feeds to their respective IOs 108. And, each IO 108 then multicasts at least the requested TV feeds to their respective COs 110. Then, each CO 110 multicasts all of the TV feeds to their respective SAIs 112. And, each SAI 112 then sends one or more of the TV feeds to their respective RGWs 114 and STBs 116 (note: if a SAI 112 is in a situation where no subscribers 120 are watching a TV channel then that SAI 112 would not send any TV feeds to their respective RGWs 114 and STBs 116). Thus, each subscriber 120 can interface with their STB 116 and select one or more of the multicast TV channels to watch on their television set 118 (or other monitor). If desired, each subscriber 120 can interface with their STB 116 and select a VoD to watch on their television set 118 (or other monitor).

Each STB 116 continuously monitors their reception buffer and can identify missing packets in a TV channel video stream that results from a packet loss somewhere upstream in the IPTV network 100. If any of these STBs 116 are missing packets then they would use this information to send an error notification 119 known as a packet loss notification-retransmission request 119 to a packet retransmission server 120 which then retransmits the missing packet(s) to the requesting STB 116. In this type of IPTV network 100, there would typically be packet retransmission servers 120 located in the SHOs 102 and the VHOs 106 but they could if desired be distributed down to and located in the IOs 108 and/or the COs 110. A more detailed discussion about how the STB 116 could send a packet loss notification-retransmission request 119 is provided in U.S. Pat. Nos. 6,693,907 and 6,782,490 the contents of which are incorporated by reference herein.

Figure 2:
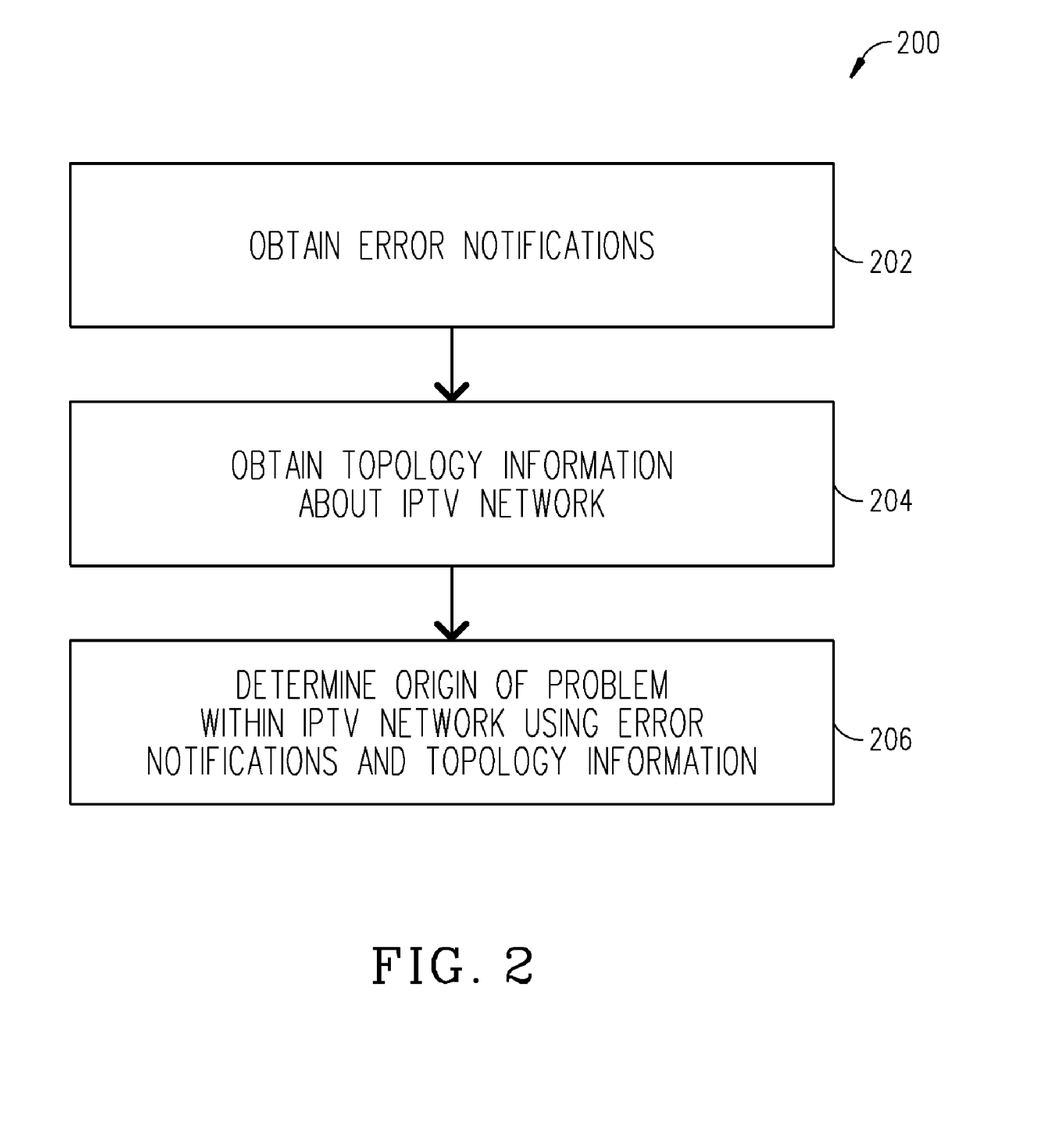
FIG. 2 is a flowchart illustrating the basic steps of a method for determining an origin of a problem within an IPTV network in accordance with the present invention.

The present invention relates to a spatial monitoring-correlation mechanism 122 and method 200 that uses the packet loss notifications-retransmission requests 119 (and possibly other types of error notifications 119) along with topology information 121 about the IPTV network 100 to locate an origin and possibly the cause of the problem (e.g., packet loss-jitter) within the IPTV network 100. The method 200 and it's associated steps are shown in FIG. 2. Basically, the spatial monitoring-correlation mechanism 122 collects error notifications 119 that can be generated by the STB(s) 116, the packet retransmission server(s) 120 and/or the nodes 102, 106, 108, 110, 112, 114 (including their respective components) and then uses this information along with topology information 121 about the IPTV network 100 to isolate one or more problems originating in the SHO 102, the core IP network 104 (core level), the VHO 106, the IO 108 (aggregation level), the CO 110 (access level), the SAI 112, and the RGW 114 (home network). A detailed discussion is provided next to explain how the exemplary spatial monitoring-correlation mechanism 122 can use error notifications 119 and topology information 121 to locate the origin and possibly the cause of one or more problems within the IPTV network 100.

In one embodiment, the spatial monitoring-correlation mechanism 122 is a distributed system that includes one or more data collectors 124 located, for example, at the SHOs 102 and the VHOs 104 (which correspond to the locations of the packet retransmission servers 120) and a central correlation engine 126 which is located in an information technology centre environment. The data collectors 124 obtain error notifications 119 (e.g., packet loss notifications-retransmission requests 119) from their respective packet retransmission server 120 or other nodes 102, 106, 108, 110, 112, 114 (which may have data collectors 124) within the IPTV network 100. The central correlation engine 126 includes a memory 128 that stores processor-executable instructions and a processor 130 that interfaces with the memory 128 and executes the processor-executable instructions to: (1) obtain the error notifications 119 (e.g., packet loss notifications-retransmission requests 119) from the data collector(s) 124 (step 202 in FIG. 2); (2) obtain the topology information 121 about the IPTV network 100 (step 204 in FIG. 2); and (3) determine the origin of the problem within the IPTV network 100 by using the error notifications 119 (e.g., packet loss notifications-retransmission requests 119) and the topology information 121 (step 206 in FIG. 2).

The spatial monitoring-correlation mechanism 122 could determine the origin of the problem in part by using information in the STB's packet loss notifications-retransmission requests 119 which typically contain the following:

A timestamp.
The STB Identifier.
The multicast channel/video stream identifier.
The identification of missing packets.
Additional measurement, error or trace data that may be available.
Additional contextual information that may be available.

Moreover, the spatial monitoring-correlation mechanism 122 may use other types of error notifications 119 in addition to or in lieu of the STB's packet loss notifications-retransmission requests 119. These alternative error notifications 119 can be generated by the STBs 116, the packet retransmission servers 120 and/or the nodes 102, 106, 108, 110, 112, 114 and can include (for example): (1) an ad-insertion error notification 119; (2) a splicing error notification 119; (3) an excessive jitter error notification 119; and (4) an excessive delay error notification 119.

The spatial monitoring-correlation mechanism 122 also determines the origin of the problem in part by using the topology information 121 about the multicast IPTV network 100 which indicates how the video streams are distributed/routed from the multicast source (encoder or streaming server located in the SHOs 102 and/or the VHOs 106) to their destination STBs 116. Typically, the IPTV network 100 has a tree structure which implies that packets lost in one node 102, 104, 106, 108, 110, 112, 114 and 116 or link affect all downstream nodes and links and subsequently all the leaves (or STBs 116) of that branch in the multicast tree. Basically, the spatial monitoring-correlation mechanism 122 relies on an accurate knowledge of the topology of the multicast IPTV network 100 which includes (for example):

The list of encoders, servers, switches, routers, DSLAMs (or ONTs/OLTs), RGWs, STBs and any other equipment capable of affecting the routing and transmission of multicast video stream packets.

The physical and logical interconnections of the encoders, servers, switches, routers, DSLAMs (or ONTs/OLTs), RGWs, STBs and any other equipment capable of affecting the routing and transmission of multicast video stream packets.

The list of all video streams (e.g., linear/unicast TV channels, broadcast TV channels).

The current forwarding/routing of each multicast video stream source.

The list of STBs 118 tuned to each multicast source (i.e. joined the multicast group).

It should be appreciated that the aforementioned tree structure (i.e. the multicast routing) may be different for different channels. For instance, the CO 110 for redundancy purposes may be connected to two IOs 108 and one IO 108 may be connected to two VHOs 106 in which case at layer 1 the network structure may not be a tree but at any given time there is typically only one route active for each multicast channel hence the multicast routing is really a tree structure. The exemplary IPTV tree 100 does not have this particular configuration but it should be appreciated that the IPTV network 100 shown herein is exemplary and that the spatial monitoring-correlation mechanism 122 can interface with many different types and many different configurations of an IPTV network.

As discussed above, the spatial monitoring-correlation mechanism 122 and in particular the central correlation engine 126 uses the error notifications 119 along with topology information 121 to locate the origin and possibly the cause of one or more problems within the IPTV network 100. A detailed discussion is provided next to explain two exemplary schemes A and B that could be implemented by the central correlation engine 126 to determine the origin and possibly the cause of the one or more problems within the IPTV network 100.

Scheme A

Scheme A is based on a set of rules which can be combined to iteratively narrow down and identify the origin and possibly the cause of the problem within the IPTV network 100. In particular, scheme A is based on rules that are triggered by error notifications 119 received from the STBs 116, the packet retransmission servers 120 and/or the nodes 102, 106, 108, 110, 112, 114 (including their respective components) to make inferences on the location and root cause the problem in the IPTV network 100. This particular rules-based approach provides a great degree of flexibility in that it allows new rules to be easily created and modified to cover additional troubleshooting scenarios. In addition, the rules can be used to trigger diagnostic tools or repair actions which can subsequently trigger further rules, diagnostic tools and actions until the problem has been completely isolated and possibly repaired. Several different rules-based examples are as follows:

Rule A.
IF The STB 116 of customer A is reporting packet loss on channel X
AND The STB 116 of other customers connected to that same DSLAM (within a SAI 112) are not reporting packet loss on channel X
THEN The problem is located in the home network (RGW 114, STB 116) of customer A OR in the link (XDSL line) to customer A.

Rule B.
IF one STB 116 of customer A is reporting packet loss on channel X
AND another STB of customer A is not reporting packet loss
THEN The problem is located in the home network (RGW 114, STB 116) of customer A.

Rule C.
IF All the STBs 116 tuned to channel X on a given DSLAM (within a SAI 112) are reporting packet loss
AND Other STBs 116 tuned to channel X on another DSLAM associated with the same CO 110 do not report packet loss
THEN The problem is located in the DSLAM OR in the link between the CO 110 and the given DSLAM (within SAI 112).

Figure 3:
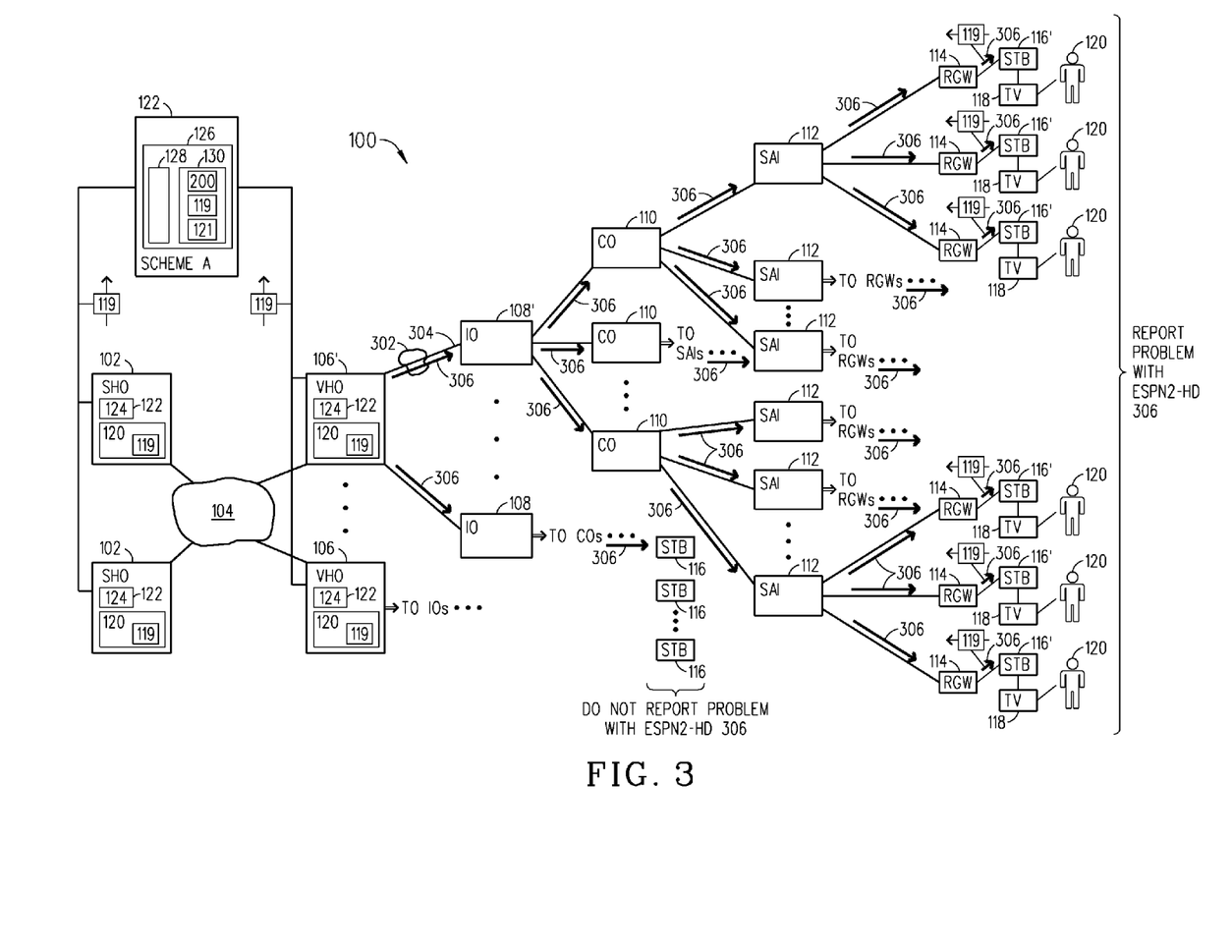
FIG. 3 is a diagram of an exemplary IPTV network which incorporates the spatial monitoring-correlation mechanism that is using a rules-based scheme to help determine an origin of a problem within the network in accordance with the present invention.

If desired, the rules-based spatial correlation scheme can be implemented more generically by using two different steps as follows (see also example associated with FIG. 3):

Step 1.
FOR EACH node N (router, switch, DSLAM, etc) in the multicast tree of the IPTV network 100 AND
FOR EACH multicast source X (linear/broadcast TV channel)
CALCULATE the % of STBs 116 receiving channel X from node N that report a packet loss Step 2.
RULE:
IF The % of STBs 116 receiving channel X (e.g., ESPN2-HD stream in FIG. 3) from node N (e.g., IO 108' in FIG. 3) that report packet loss=100%
AND The % of STBs receiving channel X (e.g., ESPN2-HD stream in FIG. 3) from the upstream node N−1 (e.g., VHO 106' in FIG. 3) that report packet loss <100%
WHERE node N−1 is the adjacent upstream device or "father" of node N in the tree-like multicast IPTV network 100
THEN The problem is located either in the node N or in the link between node N−1 and node N FIG. 3 is a diagram of the IPTV network 100 which has a problem 302 (e.g., packet loss 302) that is occurring on link 304 between one VHO 106' and one IO 108' and this problem is affecting only the ESPN2-HD channel 306. The spatial monitoring-correlation mechanism 122 would implement the aforementioned steps 1 and 2 and determine that the STBs 116' receiving this channel from this IO 108' are reporting packet loss 119 whereas the STBs 116 receiving the channel from other IOs 108 are not reporting the packet loss and hence the problem is with the link 304 between the VHO 106' and the IO 108'. As can be seen, the spatial monitoring-correlation mechanism 122 uses this rules-based scheme to efficiently identify the origin of a problem and possibly the cause of the problem within the IPTV network 100.

Scheme B.

Scheme B is based on a process (algorithm) that backtracks from the STBs 116, the packet retransmission servers 120 and/or the nodes 102, 106, 108, 110, 112, 114 (including their respective components) that are reporting packet loss (or other problems) to their common ancestor-potential root cause in the tree-like multicast IPTV network 100. This is a generic process (algorithm) which is based at least in part on the fact that STBs 116 send error notifications 119 back to the packet retransmission servers 120 when they desire the retransmission of packets. In addition, this generic process (algorithm) also based at least in part on the fact that the spatial monitoring-correlation mechanism 122 can uniquely identify these STBs 116 using, for example, unique IDs or IP addresses. An exemplary process (algorithm) is described by using the following pseudo-code:

Step 1

The spatial monitoring-correlation mechanism 122 obtains a list of the unique identifiers (IP addresses) of STBs 116 that are reporting packet loss. For instance, spatial monitoring-correlation mechanism 122 can obtain this list by using historical data that is received from the packet retransmission server 120. If desired, the STBs 116 that are reporting retransmission requests can be represented by a union indication. The spatial monitoring-correlation mechanism 122 would compute this list of STBs 116 during a given sampling period.

Step 2.

The spatial monitoring-correlation mechanism 122 finds the first node (from the downstream side of the listed STBs 116 towards the video source) that is a common ancestor to all of the STBs 116 that are reporting transmission problems. For instance, this common ancestor can be a DSLAM, a switch, or the corresponding VHO 106. The spatial monitoring-correlation mechanism 122 finds the common ancestor by going back and tracing the error upstream within the IPTV network 100.

Step 3.

Once the common node is identified, the spatial monitoring-correlation mechanism 122 tests to see if all of this node's outgoing ports are reporting an error. If yes, the spatial monitoring-correlation mechanism 122 knows that with a high probability that this particular node itself is the problem. If not and some of the outgoing ports are not reporting transmission problems, then the spatial monitoring-correlation mechanism 122 knows that the problem can be in the input interfaces reporting the problems (misconfigured queues, etc.) or with the resources of the affected channels on nodes upstream.

Figure 4:
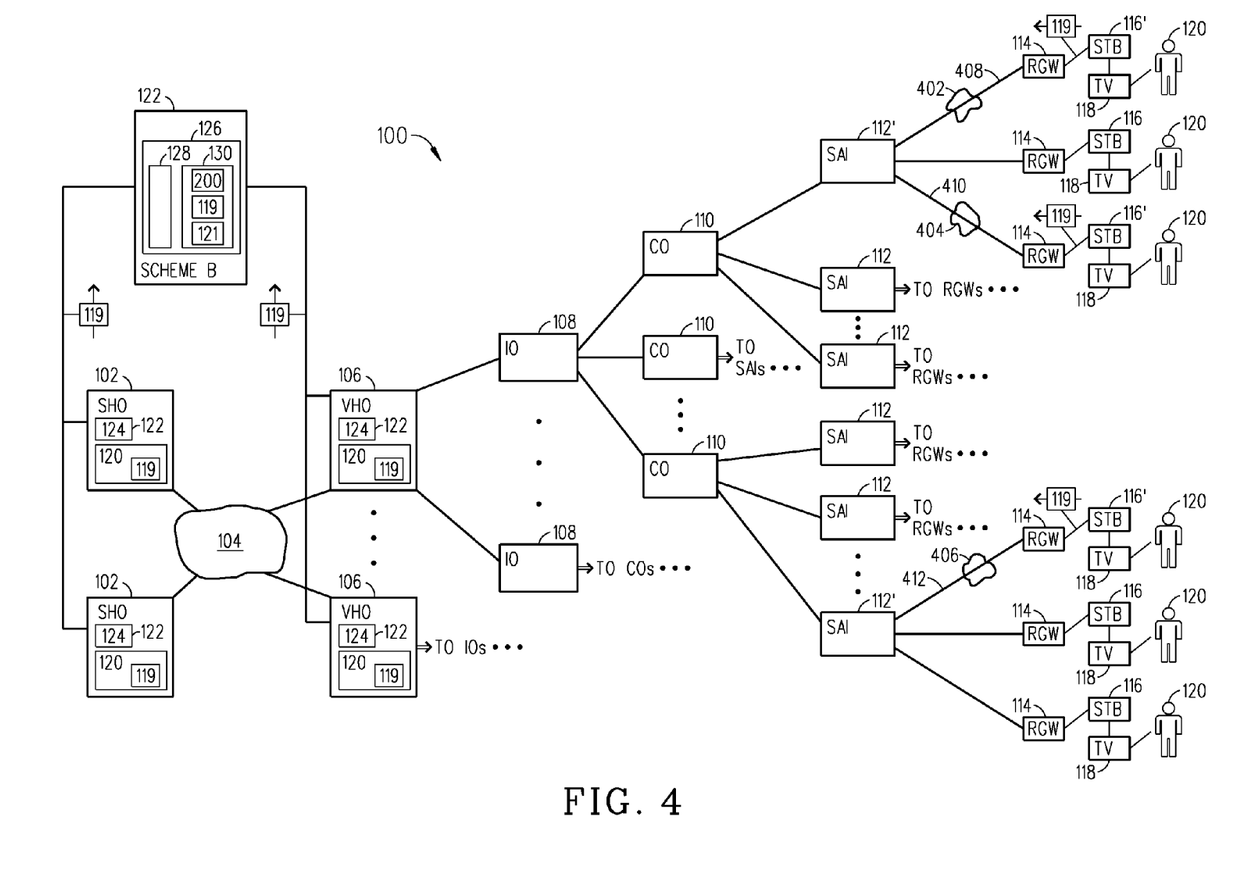
FIG. 4 is a diagram of an exemplary IPTV network which incorporates the spatial monitoring-correlation mechanism that is using a process-algorithm scheme to help determine an origin of a problem within the network in accordance with the present invention.

In addition, the spatial monitoring-correlation mechanism 122 can use a process (algorithm) that backtracks from one STB 116 (or one packet retransmission server 120 and/or one specific node 102, 106, 108, 110, 112, 114) that reported a packet loss (or other problem) to a potential root cause in the tree-like multicast IPTV network 100. FIG. 4 is a diagram of the IPTV network 100 which has multiple problems 402, 404 and 406 (e.g., packet losses 402, 404 and 406) that are occurring on VDSL links 408, 410 and 412 which are located upstream from three STBs 116'. The spatial monitoring-correlation mechanism 122 would implement the aforementioned steps 1-3 for each STB 116' reporting packet losses 119 and backtrack to the corresponding DSLAMs (within SAIs 112') where in this particular example the DSLAMs are working properly such that the problems need to be associated with the VDSL links 408, 410 and 412 just upstream from the STBs 116'. As can be seen, the spatial monitoring-correlation mechanism 122 can use this process (algorithm) scheme to efficiently identify the origin of a problem and possibly the cause of the problem within the IPTV network 100.

Both schemes A and B if desired can be combined to achieve optimum flexibility and performance. Plus, both schemes A and B can incorporate and use historical network behavior to identify chronic problems within the IPTV network 100. It should be appreciated that the spatial monitoring-correlation mechanism 122 could implement many different schemes other than the exemplary schemes A and B or in combination with the exemplary schemes A and/or B to locate the origin and possibly the cause of one or more problems within the IPTV network 100

From the foregoing, it should be appreciated that the present invention provides a spatial monitoring-correlation mechanism 122 and a method 200 for determining an origin-location of a problem (or potential problem) within the IPTV network 100 by using different schemes (rules, algorithms) in view of one or more error notifications 119 and topology information 121 about the IPTV network 100. The spatial monitoring-correlation mechanism 122 ability to determine an origin-location of a problem (or potential problem) is desirable since the typical IPTV network 100 includes large sub networks that operate at the access level, the aggregation level, and the core level. In addition, the spatial monitoring-correlation mechanism 122 is capable of not only identifying the origin-location of a problem (or potential problem) in these sub-networks but is also capable of providing a diagnosis for the root cause(s) of these problems (as reported by customer equipment) in a timely proactive fashion. Moreover, the spatial monitoring-correlation mechanism 122 has many advantages and if desired can be further enhanced as follows (for example):

- Use packet loss notifications 119 from a packet retransmission server 120 reporting missing packets in their incoming buffer cache to detect packet loss and determine whether it occurs upstream or downstream of the packet retransmission server 120 and then apply the above schemes (or other schemes) to locate the problem causing packet loss either upstream or downstream of the packet retransmission server 120.
- Use packet loss notifications-measurement reports from other nodes 102, 106, 108, 110, 112, 114 along the multicast tree to correlate with error notifications 119 from the STBs 116 (for example) and further "prune" the multicast tree to help detect the origin of the problem.
- Use packet loss notifications 119, other error notifications 119 and retransmission reports to help assess the effectiveness of the one or more packet retransmission servers 120 and from there estimate the video transmission quality.
- Automatically trigger diagnostic or repair actions in case of problems impacting the quality of service.
- Provide for intelligently locating one or more problems (or potential problems) in the IPTV network 100 and associated IPTV service while being proactive and saving time and cost.
- Pinpoint the problems (or potential problems) in the IPTV network 100 and associated IPTV service without have to use the current brute-force method.
- Actively scan for potential problems rather than waiting till the problem manifest itself within the IPTV network 100.
- Use scalable and extendable scheme to determine the origin of the problems (or potential problems) in the IPTV network 100 and associated IPTV service.
- The present invention can monitor in real time all retransmissions occurring between all live TV feeds and all STBs 116, understand what STB(s) 116 is/are affected by poor quality due to packet loss (impact analysis) and identify the exact location of the packet loss in the network path (root cause analysis).

The present invention does not rely on the use of probes to be disseminated in the IPTV network 100 and allows monitoring 24 hours/7 days a week/365 days a year of all customers 120. This means that service providers no longer need to send truck rolls to diagnose network packet loss problems and can proactively fix these problems possibly before being noticed by their customers 120.

The present invention has the ability to determine the origin of a packet loss problem (or potential packet loss problem) which is desirable since according to various studies the packet loss problems may represent 70 to 80% of all IPTV problems and frequently remain undetected until a customer service representative receives complaints from the customers 120. If there is a packet loss then the affected customers may experience pixilation, video frame freeze and/or audio silence, depending on the capability of the packet retransmission server 120 to effectively retransmit all of the missing packets (the buffer cache and retransmission capacity is necessarily limited), the ability of the IPTV network 100 to transmit these retransmission packets in due time to their final destination the STB 116, and the capability of the STB 116 (buffer size, etc).

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for locating an origin of a problem within an Internet Protocol Television (IPTV) network, said method comprising the steps of:
    obtaining topology information about the IPTV network;
    obtaining at least one error notification that is generated by at least one component within the IPTV network; and
    determining the origin of the problem within the IPTV network by using the topology information about the IPTV network and the at least one error notification that is generated by the at least one component within the IPTV network.

2. The method of claim 1, wherein the second obtaining step further includes a step of obtaining at least one packet loss notification-retransmission request generated by at least one set-top box within the IPTV network.

3. The method of claim 1, wherein the second obtaining step further includes a step of obtaining at least one packet loss notification-retransmission request from a packet retransmission server within the IPTV network.

4. The method of claim 1, wherein the second obtaining step further includes a step of obtaining at least one error notification from a node other than a set-top box within the IPTV network.

5. The method of claim 1, wherein the determining step further includes a step of using a set of rules to iteratively narrow down and identify the origin of the problem in the IPTV network.

6. The method of claim 1, wherein the determining step further includes a step of backtracking from the at least one component that generated the at least one error notification to identify a common potential root cause for the problem in the IPTV network.

7. The method of claim 1, wherein the determining step further includes using a combination of steps to identify the origin of the problem in the IPTV network where the combination of steps includes:
    using a set of rules to iteratively narrow down and identify the origin of the problem in the IPTV network; and/or
    backtracking from the at least one component reporting the at least one error notification until identify a first common potential root cause for the problem in the IPTV network.

8. The method of claim 5, wherein the using step further includes a step of using historical network behavior to determine whether the problem is a chronic problem in the IPTV network.

9. The method of claim 1, further comprising a step of using the at least one error notification to access an effectiveness of a packet retransmission server and to estimate a video transmission quality of a video stream in the IPTV network.

10. The method of claim 1, further comprising a step of automatically triggering a diagnostic-repair action after determining the origin of the problem within the IPTV network.

11. The method of claim 1, wherein the least one error notification signal is:
    a packet loss notification;
    a retransmission request;
    an add-insertion error message;
    a splicing error message;
    an excessive jitter message; or
    an excessive packet delay message.

12. The method of claim 1, wherein the problem includes a packet loss-jitter problem within the IPTV network.

13. The method of claim 1, wherein the problem includes an isolated problem in a super headend office, a video hub office, an intermediate office, a central office, a service area interface, an Internet Protocol Core, an aggregation network, an access network or a home network.

14. The method of claim 1, wherein the IPTV network has a tree structure where if the origin of the problem is one node or one link then the problem affects corresponding downstream nodes, corresponding downstream links and corresponding set-top boxes.

15. The method of claim 1, wherein the topology information indicates how video streams are distributed-routed from a multicast source to corresponding set-top boxes.

16. The method of claim 1, wherein the topology information includes:
    a list of encoders, servers, switches, routers, Digital Subscriber Line Access Multiplexers, Optical Line Terminations, Optical Network Terminations, residential gateways, set-top boxes and/or other equipment capable of affecting routing and transmission of multicast video packets;
    physical and logical interconnections of the encoders, the servers, the switches, the routers, the Digital Subscriber Line Access Multiplexers, the Optical Line Terminations, the Optical Network Terminations, the residential gateways, the set-top boxes and/or the other equipment;
    a list of all multicast sources;
    current forwarding-routing information for each video stream associated with each multicast source; and
    a list of set-top boxes that are tuned to the video streams of each multicast source.

17. A spatial monitoring-correlation mechanism, comprising:

at least one data collector located in an Internet Protocol Television (IPTV) network, where the at least one data collector obtains at least one error notification that was generated by at least one component within the IPTV network; and a central correlation engine including a memory that stores processor-executable instructions and a processor that interfaces with the memory and executes the processor-executable instructions to:

obtain the at least one error notification from the at least one data collector;

obtain topology information about the IPTV network; and determine the origin of the problem within the IPTV network by using the topology information about the IPTV network and the at least one error notification that was generated by the at least one component within the IPTV network.

18. The spatial monitoring-correlation mechanism of claim 17, wherein the central correlation engine uses a set of rules to iteratively narrow down and identify the origin of the problem in the IPTV network.

19. The spatial monitoring-correlation mechanism of claim 17, wherein the central correlation engine backtracks from the at least one component that generated the at least one error notification to identify a first common potential root cause for the problem in the IPTV network.

20. The spatial monitoring-correlation mechanism of claim 17, wherein the central correlation engine uses historical network behavior to determine whether the problem is a chronic problem in the IPTV network.

21. The spatial monitoring-correlation mechanism of claim 17, wherein the central correlation engine uses the at least one error notification to access an effectiveness of a packet retransmission server and to estimate a video transmission quality of a video stream within the IPTV network.

22. The spatial monitoring-correlation mechanism of claim 17, wherein the central correlation engine triggers a diagnostic-repair action after determining the origin of the problem within the IPTV network.

23. An Internet Protocol Television Network (IPTV) comprising:

a plurality of set-top boxes, each set-top box transmits a packet loss notification-retransmission request when there is a problem with receiving a desired video stream; and a spatial monitoring-correlation mechanism including:

at least one data collector that obtains each packet loss notification-retransmission request that was transmitted by the set-top boxes; and a central correlation engine that obtains each packet loss notification-retransmission request from the at least one data collector, obtains topology information about the IPTV network, and determines the origin of the problem within the IPTV network by using the topology information about the IPTV network and each packet loss notification-retransmission request that was transmitted by the set-top boxes.

24. The IPTV network of claim 23, wherein the central correlation engine uses a set of rules to iteratively narrow down and identify the origin of the problem in the IPTV network.

25. The IPTV network of claim 23, wherein the central correlation engine backtracks from the at least one component that generated the at least one error notification until identifying a common potential root cause for the problem in the IPTV network.

* * * * *